United States Patent [19]

Lewis

[11] Patent Number: 5,039,154
[45] Date of Patent: Aug. 13, 1991

[54] TAILGATE MOUNTING SYSTEM

[76] Inventor: Barton E. Lewis, 3035 N. Rochester Rd., Rochester, Mich. 48306

[21] Appl. No.: 665,981

[22] Filed: Mar. 7, 1991

[51] Int. Cl.⁵ .............................................. B62D 33/033
[52] U.S. Cl. ........................................ 296/52; 296/59; 296/60; 296/100; 248/503
[58] Field of Search ................... 296/50, 52, 57.1, 59, 296/60, 100; 248/503

[56] References Cited

U.S. PATENT DOCUMENTS

| | | | |
|---|---|---|---|
| 672,720 | 4/1901 | Sturgis | 296/59 |
| 3,734,560 | 5/1973 | Cramblet | 296/50 |
| 3,902,253 | 10/1888 | Reichart et al. | 296/57.1 X |
| 4,005,898 | 2/1977 | Way | 296/174 |
| 4,033,619 | 7/1977 | Cox | 296/21 |
| 4,372,601 | 2/1983 | Smith | 296/50 |
| 4,475,759 | 10/1984 | Wine | 296/180.5 |

Primary Examiner—Margaret A. Focarino
Assistant Examiner—Andrew C. Pike
Attorney, Agent, or Firm—Peter D. Keefe

[57] ABSTRACT

A mounting system for a conventional tailgate of a pick-up truck is capable of situating the tailgate so as to minimize drag and at the same time provide effective use of the tailgate. Two mounting brackets are each structured to include a base for being mounted upon the top end of a respective sidewall of a pick-up truck cargo bed. Each of the mounting brackets is further structured with a particular fitting for interfacing with reciprocably shaped fittings on the tailgate to removably secure, in a selectively lockable manner, the tailgate to the fittings, in the same manner that the tailgate conventionally attaches to the conventional fittings located at the inside wall of the sidewalls of the pick-up truck.

6 Claims, 2 Drawing Sheets

TAILGATE MOUNTING SYSTEM

BACKGROUND OF THE INVENTION

1. Field of the Invention:

The present invention relates to mounting devices for securing a tailgate to a pick-up truck, and more particularly to a mounting system for a tailgate which permits that tailgate to be advantageously stored and utilized upon the top ends of sidewalls of the pick-up truck.

2. Description of the Prior Art:

Pick-up trucks utilize a tailgate at the rear of the cargo bed which is pivotably mountably to the sidewalls of the cargo bed. When in the up position, the tailgate serves as rear sidewall of the cargo bed. When in the down position, the tailgate is out of the way for loading and unloading of the cargo bed.

While the tailgate is clearly an important part of a typical pick-up truck, its use is not entirely with out compromise. One major compromise is that of fuel economy. When a pick-up truck is operating at highway speed with the tailgate in its up position, considerable wind-drag is generated which is definitely noticeable to the driver. Operation of the pick-up truck with the tailgate in the down position is not safe, and the removal of the tailgate, while facilitated by quick connection fittings presently in use, is of dubious value as the tailgate must be stored somewhere and may not be available when it is needed.

In the prior art there have been variously successful attempts at solving the tailgate wind-drag problem.

U.S. Pat. No. 4,372,601 to Smith, dated Feb. 8, 1983, discloses a tailgate which is pivotable not only outwardly away from the cargo bed, but is mounted so as to also be pivotable into the cargo bed. Retainers hold the tailgate downwardly against the cargo bed floor, thus minimizing wind-drag when the tailgate is not needed.

U.S. Pat. No. 4,475,759 to Wine, dated Oct. 9, 1984, discloses a tailgate which is mounted with respect to the sidewalls so that it may be pivoted not at the bottom edge, but rather nearer a mid-point position. By positioning the tailgate to have a selected angle with respect to the cargo bed floor, air flow can be controlled and wind-drag thereby reduced.

It has also become increasingly popular for pick-up truck driver's to abandon their conventional tailgates in favor of a plastic tailgate substitute, wherein the tailgate substitute is constructed in the form of a large spaced netting of vertical and horizontal strips. The spaces between plastic vertical and horizontal strips serve to allow air to pass through so as to reduce wind-drag.

While each of the foregoing device are aimed at reducing wind-drag associated with tailgates, none provides a solution that works with a conventional tailgate.

Further, the tailgate in the up position blocks a substantial area of view of the driver when backing-up the pick-up truck. Driving with the tailgate down is not proper, so drivers are left to simply deal cautiously with this danger.

Accordingly, what is needed in the art is a mounting system for a conventional tailgate that is capable of situating the tailgate so as to minimize drag, improve drive rearward visibility, and at the same time provide effective use of the tailgate.

SUMMARY OF THE INVENTION

The present invention provides a mounting system for a conventional tailgate of a pick-up truck which is capable of situating the tailgate so as to minimize drag, improve driver rearward visibility, and at the same time provide effective use of the tailgate.

The present invention is composed of two mounting brackets, each of which being structured to include a base for being mounted upon the top end of a respective sidewall of a pick-up truck cargo bed. Each of the mounting brackets is further structured with a particular fitting for interfacing with reciprocably shaped fittings on the tailgate to removably secure, in a selectively lockable manner, the tailgate to the fittings, in the same manner that the tailgate conventionally attaches to the conventional fittings located at the inside wall of the sidewalls of the pick-up truck. The mounting brackets according to the present invention are mounted to the top ends of the sidewalls so that the tailgate may be positioned in a first (forward) position whereby the tailgate lays upon the sidewalls with the upper end of the tailgate being located adjacent the cab; and further so that the tailgate may be optionally pivoted about the fittings of the mounting brackets to a second (rearward) position whereby the tailgate lays on the top ends of the sidewalls with the upper end of the tailgate facing the rear of the cargo bed. In the forward position, drag is minimized and the tailgate serves as a cover for articles immediately below in the cargo bed and as a seat for occupants in the cargo bed; in the rearward position, drag is minimized and the tailgate may serve as a seat for passengers riding in the cargo bed.

Accordingly, it is an object of the present invention to provide a tailgate mounting system for a pick-up truck which is capable of situating the tailgate so as to minimize drag, improve driver rearward visibility (particularly when backing-up), and at the same time provide effective use of the tailgate.

It is an additional object of the present invention to provide a tailgate mounting system for pick-up trucks in which the tailgate may be removed from its conventional fittings at the rear of the cargo bed and thereupon mounted to the top ends of the sidewalls of the cargo bed utilizing fittings which connect to the tailgate similarly to the manner of conventional tailgate fittings.

It is a further object of the present invention to provide a tailgate mounting system for a pick-up truck in which the tailgate may be removed from its conventional fittings at the rear of the cargo bed and mounted to the top ends of the sidewalls of the cargo bed utilizing fittings which connect to the tailgate similarly to the conventional brackets, the tailgate being mounted so that the tailgate rest upon the sidewalls in a first position adjacent the cab, and is pivotable to a second position remote from the cab.

These, and additional objects, advantages, features, and benefits of the present invention will become apparent from the following specification.

DETAILED DESCRIPTION OF THE PREFERRED EMBODIMENT

Figure 1:
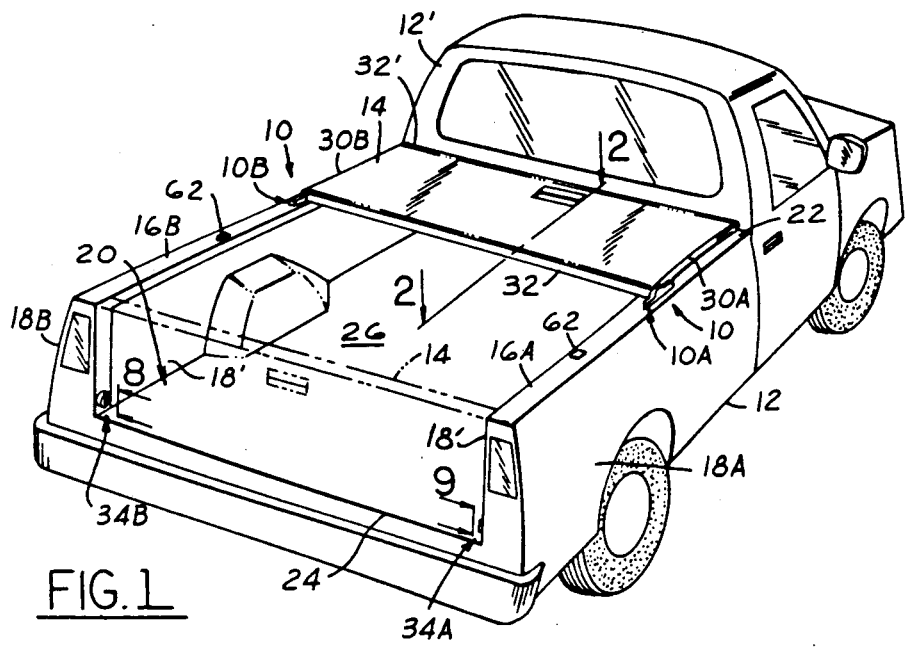
FIG. 1 is a perspective view of the tailgate mounting system according to the present invention, seen in use with a pick-up truck.

Referring now to the Drawing, FIG. 1 shows the tailgate mounting system 10 according to the present invention in operation in connection with a pick-up truck 12. As will be seen in FIG. 1, the tailgate mounting system 10 is structured to provide mounting brackets 10A and 10B for securing the tailgate 14 of the pick-up truck to the top ends 16A and 16B, respectively, of the pick-up truck sidewalls 18A and 18B. The sidewalls define a cargo bed 20 having a forward end 22, a rearward end 24, and a floor 26.

A. Structure and Operation of Conventional Tailgate Fittings

The tailgate 14 is conventionally mounted to the sidewals 16A, 16B at the rearward end 24 of the cargo bed 20 via a pivotable interconnection between conventional fittings. The interconnection permits the tailgate to rotate on the conventional fittings between a selectively lockable up position (shown in phantom in FIG. 1) in which case the tailgate resembles and serves as a rear portion of the sidewalls 18A, 18B, and a down position in which case the tailgate is generally oriented parallel with the floor 26.

While automotive manufacturers may change structural specifications from time to time, the present typical structure of the aforesaid conventional fitting interconnection is best understood by reference now being made to FIGS. 1, 4, 8, and 9. The tailgate 14 is equipped with conventional tailgate fittings 28A and 28B that are located at the right and left sides 30A and 30B thereof, adjacent the bottom edge 32. The conventional fittings 28A, 28B are structured to interconnect with respective right and left reciprocally shaped conventional sidewall fittings 34A and 34B located on the inside surface 18' of the sidewalls 18A, 18B, adjacent the floor 26. The conventional sidewall fittings 34A, 34B are male and the conventional tailgate fittings 28A, 28B are female with reciprocable shape to interconnect with the conventional sidewall fittings.

Figure 4:
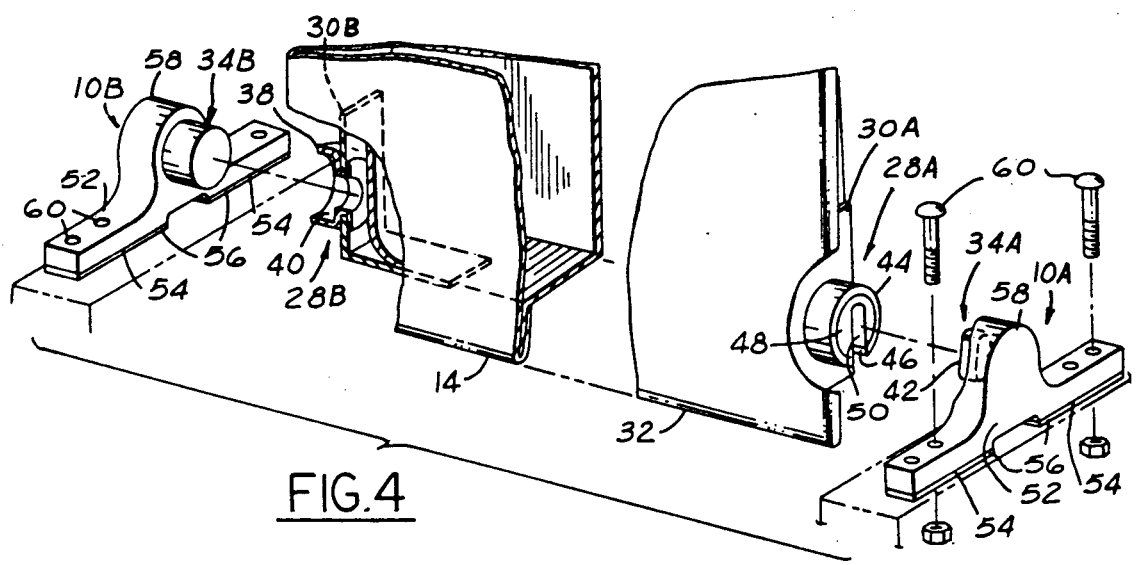
FIG. 4 is a perspective view of the tailgate mounting system according to the present invention, showing a typical interconnection with a conventional tailgate.
Figures 8, 9:
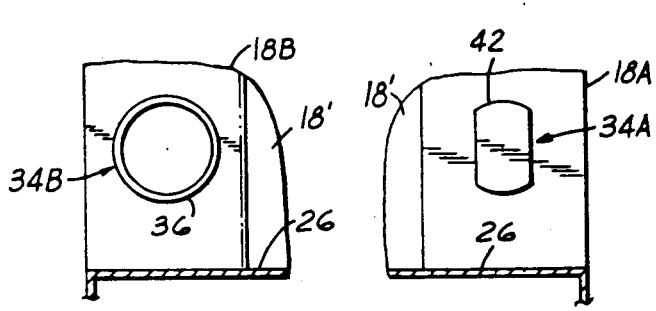
FIG. 8 is a detail perpective view seen along lines 8—8 in FIG. 1, showing a first conventional sidewall fitting.
FIG. 9 is a detail perspective view seen along lines 9—9 in FIG. 1, showing a second conventional sidewall fitting.

As can best be understood by reference to FIGS. 1, 4, and 8, the left side conventional sidewall fitting 34B is structured in the form of a cylindrical stud 36 that projects from the inside surface 18' of the sidewall 18B. The left side conventional tailgate fitting 28B is structure in the form of a truncated hollow cylinder 38 projecting from the side 30B, the blind bore 40 formed therein being sized to receive the cylindrical stud 36.

As can best be understood by reference to FIGS. 1, 4, and 9, the right side sidewall fitting 34A is structured in the form of a narrow stud 42 that projects from the inside surface 18' of the sidewall 18A. The right side conventional tailgate fitting is structured in the form of a truncated hollow cylinder 44 having an axial slit 46. Rotatably mounted within the hollow cylinder 44 is cylindrical insert 48 that is preferably constructed of a polymer material. The cylindrical insert 48 is provided with a slot 50 which may be aligned with the axial slit 46. Both the slot 50 and the axial slit 46 are sized to receive the narrow stud 42.

Figure 5:
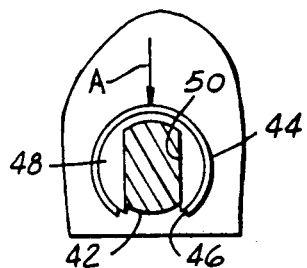
FIGS. 5 through 7 show an end view of a fitting according to the present invention particularly showing interconnection and pivotable interrelationships between particular fittings for mounting the tailgate.

Operation of the conventional fittings hereinabove described will now be described. The tailgate is installed at the rearward end 24 of the cargo bed 20 by first interconnecting the left side conventional fittings 34B and 28B by inserting the cylindrical stud 36 into the truncated hollow cylinder 38. Then the right side conventional fittings 34A and 28A are interconnected by first rotating the cylindrical insert 48 so that its slot 50 is aligned with the axial slit 46, then sliding the narrow stud 42 vertically along arrow A into the slit 46 and slot 50, as shown generally in FIG. 5. Now the tailgate may be pivoted on the fittings along arrows B and C in FIGS. 6 and 7 between the aforesaid up and down positions, and yet the narrow stud will remain trapped by the hollow cylinder 44. The tailgate 14 may be removed by lifting the tailgate upwardly at the right side conventional fittings 34A, 28A and then reversing the installation steps just elaborated.

B. Structure and Operation of the Tailgate Mounting System

Referring now to FIG. 4, the structure of the tailgate mounting system 10 according to the present invention will be described. The tailgate mounting system 10 is composed of two similarly constructed mounting brackets 10A and 10B, but which may differ in the type of fitting that each carries. Each mounting bracket 10A, 10B is composed of an elongate base 52 which includes a bottom 54 structured for interfacing with the top ends 16A, 16B of the sidewalls 18A, 18B. In this regard it is preferred to include a strip 56 of resilient polymer material, such as rubber, between the base and the top edge of the sidewalls so as to prevent marring the sidewalls. The mounting brackets 10A, 10B are further composed of an extension member 58 which is integral with the base 52 and extends directly away from the bottom 54 thereof. Each extension member 58 is provided with a conventional fitting of the type current in the art for tailgate mounting to the rear end of the cargo bed. For purposes of description herein, fittings of the type 34A and 34B are provided on the extension members, respectively. In this regard, the right side mounting bracket 10A includes a conventional fitting 34A, structured as described hereinabove; and the left side mounting bracket 10B includes a conventional fitting 34B, structured as described hereinabove. Connection of the mounting brackets 10A, 10B to the top end of the sidewalls is accomplished by suitable fasteners, such as bolts 60.

With the mounting brackets installed upon the sidewalls of the pick-up truck, the right and left side conventional fittings 28A, 28B of the tailgate may be removably interconnected with the right and left conventional fittings 34A, 34B of the mounting brackets 10A, 10B in the manner described hereinabove respecting the conventional installation of a tailgate 14. It is preferred to provide resilient pads 62 at selected locations on the top ends of the sidewalls for the tailgate 14 to rest upon, thereby reducing the possibility of clatter on rough roads, or marring of the sidewalls due to rubbing of the tailgate thereupon.

Figure 2:
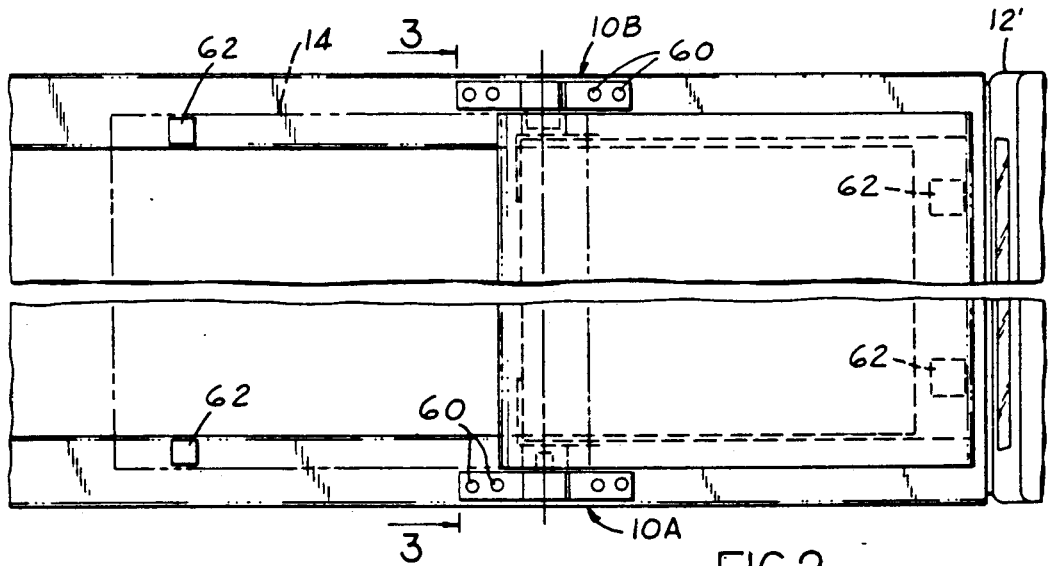
FIG. 2 is a plan view along lines 2—2 of FIG. 1, showing the tailgate mounting system according to the present invention in operation on the upper end of the sidewalls of a pick-up truck.
Figure 3:
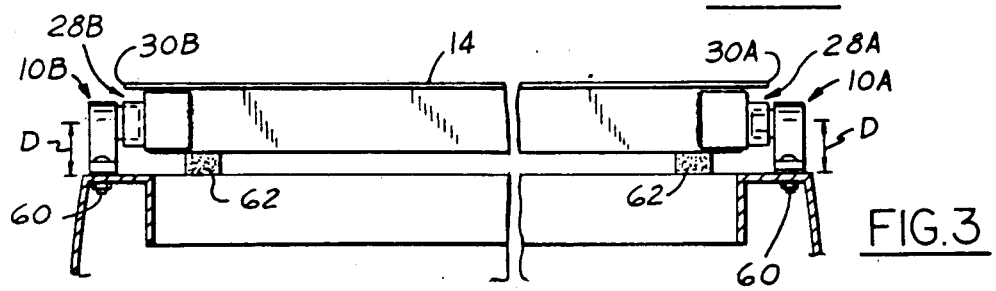
FIG. 3 is a rear end view along lines 3—3 of FIG. 2, showing the tailgate mounting system according to the present invention in operation on the upper end of the sidewalls of a pick-up truck
Figure 6:
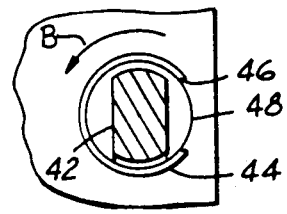
Figure 7:
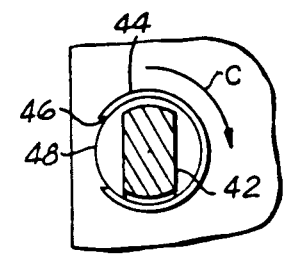

As indicated in FIGS. 1, 2, and 3, the mounting brackets are installed upon the top ends 16A, 16B of the sidewalls 18A, 18B so that when the tailgate 14 is installed onto the fittings, the top edge 32' of the tailgate may be pivoted on the fitting to a first position, as shown in FIG. 7, so that it is preferably adjacent the cab 12' of the pick-up truck, as shown in FIG. 1. The tailgate 14 may also be pivoted 180 degrees on the fittings, as shown in FIG. 6, to a second position, as shown in FIG. 2. In order that the tailgate be pivotable between the first and second positions shown in FIGS. 1 and 2, the extension members 58 must project away from the base 52 a sufficient length so that the conventional fittings 34A, 34B are thereby spaced a distance D with respect to the top edge 16A, 16B of the sidewalls that ensures the tailgate bottom edge 32 will not interferingly touch the sidewalls during pivotal movement on the conventional fittings, as shown in FIG. 3. As generally indicated by FIGS. 1, 2, and 3, the tailgate 14 lays flatly with respect to the top ends 16A, 16B of the two sidewalls 18A, 18B when the tailgate is in the first and second positions.

When the tailgate is in the position shown in FIG. 1, it is positioned so as to involve very little wind-drag, and it has been found to provide a certain wind movement pattern which tends to keep loose objects located in the cargo bed beneath the tailgate from being dislodge or blown-away during driving at highway speeds. Further, the tailgate in this position can serve as a seat for passengers riding in the cargo bed. When the tailgate is in the position shown in FIG. 2, it is positioned to have very little wind-drag, and serves as a comfortable seat for any passengers riding in the cargo bed.

To those skilled in the art to which this invention appertains, the above described preferred embodiment may be subject to change or modification. For instance, the structure of the conventional fittings may be varied so as to suit those utilized in a particular pick-up truck. Such change or modification can be carried out without departing from the scope of the invention, which is intended to be limited only by the scope of the appended claims.

What is claimed is:

1. A tailgate mounting system for mounting a tailgate to a pick-up truck, wherein the tailgate is conventionally mounted at one location on the pick-up truck, further wherein said tailgate mounting system provides mounting of the tailgate at a second location on the pick-up truck, the pick-up truck having a cargo bed defined by two sidewalls, each sidewalls having a top end, the tailgate having a first tailgate fitting on one side thereof for removably interconnecting with a first sidewall fitting on one sidewall, the tailgate further having a second tailgate fitting for removably interconnecting with a second sidewall fitting on the other sidewall, said tailgate mounting system comprising:
   a first mounting bracket, said first mounting bracket comprising:
      a first base, said first base having a first bottom structured for interfacing with the top end of the one sidewall of the pick-up truck;
      a first extension member connected with said first base, said first extension member projecting directly from said first bottom of said first base; and
      a first fitting shaped similarly with respect to the first sidewall fitting for removably interconnecting with the first tailgate fitting of the tailgate;
   means for mounting said first mounting bracket to the top end of the one sidewall;
   a second mounting bracket, said second mounting bracket comprising:
      a second base, said second base having a second bottom structure for interfacing with the top end of the other sidewall of the pick-up truck;
      a second extension member connected with said second base, said second extension member projecting directly away from said second bottom of said second base; and
      a second shaped similar with respect to the second sidewall fitting for removably interconnecting with the second tailgate fitting of the tailgate; and
   means for mounting said second mounting bracket to the top end of the other sidewall;
   wherein said first mounting bracket is mounted to the top end of the one sidewall and said second mounting bracket is mounted to the top end of the other of the sidewalls, said first fitting faces said second fitting, and the first tailgate fitting is removably mountable to said first fitting and the second tailgate fitting is removably to said second fitting to thereby permit mounting of the tailgate to the top end of each of the sidewalls of the pick-up truck.

2. The tailgate mounting system of claim 1, wherein the pick-up truck has a cab and the tailgate has a top edge; wherein said first and second extension members of said first and second mounting brackets are dimensioned so that the tailgate may be pivoted from a first position in which the top edge of the tailgate faces toward the cab, and to a second position in which the top edge of the tailgate faces away from the cab, in each of said first and second positions the tailgate lays substantially flatly with respect to the top end of each of the two sidewalls of the pick-up truck.

3. The tailgate mounting system of claim 2, wherein the pick-up truck has a front wall with a top end; said tailgate mounting system further comprising resilient pad means connected with the top end of each of the two sidewalls and the top end of the front wall for the tailgate to rest resiliently thereupon when the tailgate is in said first and second positions.

4. The tailgate mounting system of claim 3, further comprising resilient strip means for being placed upon each of said first and second bottoms.

5. The tailgate mounting system of claim 3, wherein the first and second mounting brackets are mounted to the top end of each of the two sidewalls so that the top edge of the tailgate is located adjacent the cab when the tailgate is in said first position.

6. The tailgate mounting system of claim 5, wherein said first fitting is shaped in a form of a narrow stud oriented vertically with respect to the top end of the sidewalls, further wherein said second fitting is shaped in a form of a cylindrical stud.

* * * * *